United States Patent [19]

Scott

[11] 4,379,722
[45] Apr. 12, 1983

[54] PIPELINE GEL PLUG
[75] Inventor: Paul R. Scott, Houston, Tex.
[73] Assignee: Shell Oil Company, Houston, Tex.
[21] Appl. No.: 116,506
[22] Filed: Jan. 29, 1980

Related U.S. Application Data

[63] Continuation of Ser. No. 932,395, Aug. 9, 1978, abandoned, which is a continuation of Ser. No. 836,876, Sep. 26, 1977, abandoned.

[51] Int. Cl.$^3$ .................. B01J 13/00; C09K 3/00
[52] U.S. Cl. ........................... 106/287.17; 166/294; 252/8.55 R; 405/157; 405/158; 405/171
[58] Field of Search ............... 252/316, 8.55 R, 28; 166/294; 405/157, 158, 161, 166, 167, 168, 171, 184; 106/287.17

[56] References Cited

U.S. PATENT DOCUMENTS

| | | | |
|---|---|---|---|
| 2,531,440 | 11/1950 | Jordan | 252/28 |
| 3,705,107 | 12/1972 | Hoeppel | 252/316 |
| 3,890,693 | 6/1975 | Eagleton et al. | 405/158 X |
| 4,040,974 | 8/1977 | Wright et al. | 252/28 X |
| 4,052,862 | 10/1977 | Lamy | 405/171 |

OTHER PUBLICATIONS

Nelson: Petroleum Refinery Engineering, Fourth Edition, McGraw-Hill Book Co., Inc., 1958, pp. 215–218, 685 and 686.

Primary Examiner—Richard D. Lovering

[57] ABSTRACT

A gel plug of mineral oil, organo-modified smectite, and a particulate filler such as powdered coal, or a gel plug of mineral oil and organo-modified smectite is employed during construction of an off-shore pipeline to separate a gas-filled portion of the pipeline from a water-flooded portion, and to facilitate control and movement of a gas/gel plug/water interface as desired to assist in construction operations.

2 Claims, 5 Drawing Figures

PIPELINE GEL PLUG

This is a continuation of application Ser. No. 932,395, filed Aug. 9, 1978, now abandoned, which in turn is a continuation of application Ser. No. 836,876, filed Sept. 26, 1977, now abandoned.

BACKGROUND OF THE INVENTION

Pipelines are long, hollow, flexible tubes of metal. When one end of a long pipeline lying horizontally on a flat surface is raised vertically, the pipe bends due to the weight of the unsupported segment. The maximum bending stress occurs in the bend near or at the horizontal surface. This bend is commonly referred to as the sagbend. As the end of the pipe is raised higher, the bending stress increases in the sagbend. Depending partially upon the pipe diameter, the wall thickness and the tensile strength of the metal, the pipe will collapse when the compressive and tensile forces developed along the bend exceed the physical strength of the metal walls. The collapse may result in tearing and otherwise rupturing the pipe wall. When this occurs under water, as in a submarine pipe laying operation, it is known as a wet buckle. The free end of an anchored horizontal pipe can be raised higher before collapse occurs, if the pipe is stretched, e.g., kept under tension. Loss of the ability to keep the pipe under tension, due possibly to the failure of a barge anchor to hold, may result in a wet buckle of the pipe. The high velocity (up to 100 fps) water which enters through the rupture may fill a significant portion of the pipe before corrective action can be taken. Further, the water introduces undesirable and difficult to remove silt, sand and stones into the line. Before laying can be resumed, the pipe is commonly blown clear of water so that the ruptured end can be picked up. Wet buckles thus can result in substantial delays.

Lines can also be ruptured or punctured by foreign objects away from the sagbend. Anchors of ships are an example of such foreign objects. Water rushing in through the puncture will reach the sagbend and begin to fill the vertical portion of the pipe. The additional unsupported weight will in turn lead to a wet buckle at the sagbend.

One method of burying pipe lying at the bottom of water is to remove the soil beneath the pipe with high-velocity water jets which suspend the soil particles in a water-soil slurry so that the pipe sinks into the suspended soil. An air-filled pipe, because of its light weight in the water, will not sink into the suspension as readily as water-filled pipe. While water filling the pipe prior to trenching can reduce the time, effort, and expense of burying the pipe, the water may also lead to wet buckles as above noted.

A weight coating such as concrete may be applied to large-diameter pipe to cause it to sink in water. The weight handling ability of the pipe laying equipment and economic reasons normally limit the quantity of coating close to the minimum necessary to cause the pipe to sink. The air-filled pipe lying on the bottom of the water body then is near the density of the water and thus easily moved about by flow currents which can shed vorticies behind the pipe. These vorticies, if at one of the natural frequencies of the pipe, may induce vibratory motion in the pipe with resulting stresses spalling the concrete off the pipe, creating a buoyant pipe. Thus, it is desirable to water-fill pipe, yet somehow avoid the above-noted problems with wet buckles.

Of pertinence to the present invention are U.S. Pat. Nos. 3,425,453; 3,842,613; 3,788,084; 3,472,035; 3,656,310; 3,777,499; 3,525,266; 3,751,932; 3,890,693.

The present invention not only provides a solution to the above problems, but also includes other improvements as more particularly described hereinafter.

SUMMARY OF THE INVENTION

A primary purpose of the present invention is to provide a movable gel plug of mineral oil, smectite, and a filler, or a gel plug of mineral oil and smectite, which will separate a water-filled segment of an offshore pipeline from an ambient air-filled segment, and thus allow water-fill weighting of a completed segment to a predetermined distance from an operating lay barge. The smectite is an organo-modified montmorillonite clay such as tetraalkyl ammonium smectite. The mineral oil is a hydrocarbon such as that derived from organic matter as exemplified by petroleum. The filler is a particulate such as coal dust, calcium carbonate, and gypsum.

DESCRIPTION OF PREFERRED EMBODIMENTS

The movable gel plug of the present invention is designed so that: (1) it can be pumped at low velocities in a large-diameter underwater pipe at a predetermined pressure, and upon cessation of pumping stops to withstand the hydrostatic force exerted by a relatively high column of water; (2) it can be pumped for many miles without losing this ability; (3) it is not contaminated by existing coatings on the pipe wall or by sea water and debris which may enter the pipe during construction; and (4) after stagnation time of up to one year or longer, it is movable by the previously predetermined pressure.

Such a movable gel plug, as above described, may be inserted into an underwater pipeline at the shore end and followed by pressurized water which pushes the plug into the desired position. This part of the pipeline when sinks due to increased weight. When the unfinished end of the pipeline is temporarily abandoned (due to weather conditions, et cetera), air is sealed into the unfinished but capped end. The shore end is further pressurized to reduce the volume of air, causing the pipeline to sink. To retrieve the unfinished end, the pressure is merely reduced.

The gel plug may also be used in a segment of pipe to temporarily prevent sea water from flooding the pipe when it is towed empty to the job site. Pipelines are sometimes constructed by joining long segments of pipe, made up on land, and then towed or dragged to the installation points for joining into the pipeline. In these operations, it is desirable to reduce the weight of the segments by the buoyancy of the air-filled pipe. Gel plugs are placed at each end of such segments to prevent water filling during pipe tow.

The primary constituents of the gel plug of this invention are mineral oil, smectite and a filler. Gel plug properties may be adjusted within limits, by the appropriate concentration and type of these constituents. The requirements of a movable gel plug for a submarine pipeline are unique and differ from requirements for such things as drilling fluids, mudpacks, product separators, and line scrapers which, in fact, are not comparable to the present invention. The movable gel plug is a plastic fluid having a high yield strength, high viscosity, and low gel strength. The yield strength is independent of shear stress, shear rate, total work input, and time. Plastic fluids were defined by Bingham as fluids having a yield strength that must be exceeded in order to initiate flow. More importantly for the movable gel plug, the flow stops when the force applied is less than the force required to overcome the yield strength. Plastics exhibiting thixotropic properties (e.g. their flow properties may be time-dependent) are undesirable for use with the present invention. When a thixotropic fluid is allowed to stand quiescent, a gel structure is built up. When stress is applied, the gel structure breaks when the gel strength is exceeded. Movement further reduces the gel structure and decreases the flow resistance.

A thixotropic plastic, at low pressures, usually flows as a plug lubricated by a thin film of highly sheaved liquid at the pipe wall when the applied force is greater than the resistance force due to the yield strength. Accordingly, non-thixotropic Bingham plastic is the best type of fluid for the movable gel plug. Inasmuch as the yield value of a plastic fluid can depend on friction between particles, specific surface area, and interparticle attractive forces, the gel plug of the present invention also contains a high concentration of small, solid particles.

The adhesive bond between the gel plug and pipewall must require more force to break than the force required to overcome the yield strength. Otherwise, the force required to move the plug would be equal to the force required to overcome the adhesive bond and not the yield strength. Also, the gel plug of this invention has the ability to adhere to the pipe wall if it is oil wet, water wet, or coated with paints or dirt. Because of this requirement, the gel plug employs polar, aromatic, acidic, unsaturated, and adhesive polymer materials.

If, for example, the maximum pipeline depth below mean sea level is 530 feet, and the height of an on-shore water injection pump is 50 feet above mean sea level, then the maximum hydrostatic head to which a gel plug therein, followed by water, can be exposed is 580 feet. Conservatively assuming that the line is filled with treated 3.5% saline sea water at 4° C., then the 580 feet head corresponds to a hydrostatic pressure of 259 psi. Such a plug must, at a minimum, be able to withstand this pressure without movement. Higher yield pressures (initiation of motion), however, are desirable in view of incursion of foreign water into the gel plug leading to decreased plug yield strength. For water-immiscible plugs, the foreign water is transported through the center of the plug and deposited at the front end. Continued plug movement pushes the water ahead without intermingling of the two phases. During the time that water is within the gel plug, the plug as a whole exhibits lower yield strength and viscosity. Sources for the incursion consist of water slippage past water/gel plug separators and line breaks in the leading part of the plug. The separators of the present invention do not pass water during normal operations but may do so when moving over obstacles left within the pipe. Accidental line breaks in the leading part of the plug, where internal pressure is less than local sea hydrostatic pressure, similarly allow water incursion. Line breaks at the trailing part of the plug will lead to gel discharge into the sea. In addition to the above accidental gel loss, there is some continuous loss past the separators as the plug moves down the line.

Considering the above parameters, it is preferred, as mentioned, that the gel materials behave as Bingham plastics or shear thinning Bingham plastics, and that the gel plug yield strength be over designed by in some cases a factor of about two. The yield pressure may then be twice the maximum hydrostatic pressure. Another requirement for the plug is that it be able, at a minimum, to move at the maximum pipelaying rate, and to do so at acceptable pressures. For example, if the maximum design velocity is 0.2 fps or 3.27 miles per day, and the pressure limit is approximately 2200 psi, and design line discharge pressures range from 1100 to 1400 psi, then it is desirable that the plug move at 0.2 fps when subjected to about 1000 psi. Short plugs are undesirable because: (1) the consequent high yield gel is difficult to prepare and handle; (2) more rapid depletion of short plugs assuming quantity of gel material left behind by water/gel separators is independent of yield strength; and (3) reduction in yield and viscosity is more severe in short plugs for a fixed quantity of water incursion. Long plugs, on the other hand, also have drawbacks; for example: (1) the attendant low yield strength is more likely to allow water seepage past water/gel separators; (2) cost is approximately proportional to length; and (3) gel plug disposal problems are proportional to length. The present invention strikes a compromise between the above-listed criteria for determining length.

Velocity is approximately proportional to pressure drop and inversely proportional to plastic viscosity. The pressure drop to sustain a given velocity is controlled by the choice of viscosity. A high viscosity, resulting in a high pressure drop, yields a thick boundary layer along the pipe wall. The gel material beyond the boundary layer moves as a solid core. A thick secondary layer provides a good mixing and renewal of the gel layer immediately adjacent to the wall, faster than is the case with a thin boundary layer. Contamination of the wall layer by foreign substances (rust, debris, oil, water) and reduction in its effectiveness are also less severe with thick boundary layers. Water fingers along the plug and pipewall result in a thin annulus in the case of high yield but low viscosity materials. For high viscosity materials, the water is transported along the solid core resulting in a lower reduction in plug effectiveness. Further, high-viscosity plugs require very high pressures for rapid motion and such pressures may not be available. Also, high viscosity plugs have an inherent safety factor against equipment failure or unforeseen gel failure as they provide a longer reaction time for correction. In summary, high-viscosity gel materials are desirable in the present invention because of: (1) more rapid renewal of contaminated wall layers; (2) reduced likelihood of water fingering along the pipewall, resulting in total or partial plug failure; and (3) increased reaction time for correcting system failures or malfunctions.

Gel plug disposal methods depend on the plug constituents and environmental requirements. It is highly likely that plugs of low toxicity such as the present composition can be discharged into the sea. If the solid filler is powdered coal, resulting in a plug specific gravity of approximately 1.1, the plug will remain stable on the sea floor for eventual biological degradation. If disposal at sea is deemed unacceptable for any reason, then the plug material can either be barged to shore for eventual disposal or can possibly be cleaned and disposed as oil-base drilling muds are.

Considering the above requirements for the gel plug, it has been found that mineral oils suitable for use in the invention are mainly hydrocarbons derived from organic matter such as, for example, petroleum. More specifically, preferred mineral oils are residual oils from thermal cracking processes. Oils that are suitable include an olefin plant gas oil which contains some aromatics and is derived by cracking butane, naptha, or gas oils to make ethylene, and a vacuum-flashed residue of thermally-cracked straight run pitch which contains aromatics and high-molecular weight compounds such as asphaltenes, nitrogen bases and oxygen compounds; blends of these two oils are also suitable. Typical properties of oils blended to be incorporated in gel plugs are shown in Table 1.

In further compliance with the above-described requirements, the smectite of the composition is an organo-modified montmorillonite clay such as a tetraalkyl ammonium smectite. VG69, manufactured by Magcobar Oil Field Products, Division of Dresser Industries, is an example of smectite usable for gel plug formulations. Such a clay has a high gelling efficiency over a wide range of intermediate and low polarity organic liquids including various hydrocarbon oils and solvents. It produces reproducible thixotropic consistency over a wide temperature range and imparts particle suspension, preventing hard settling of fillers.

Also used with the mineral oil and the smectite for reasons as above described are fillers such as coal dust, calcium carbonate, gypsum or the like. Typical properties of smectite and one filler are shown in Table 2.

Components selected as the best readily available materials for formulating movable gel plugs for pipelines are:
 1. Dubbs No. 9 Flashed Residue (vacuum-flashed residue from thermally cracked oils produced by Shell Oil Company at its Deer Park Manufacturing Complex);
 2. APO-100 Gas Oil (Olefin Plant No. 2 Residual Light Gas Oil produced by Shell Oil Company at its Deer Park Manufacturing Complex);
 3. Alabama Low Sulfur Coal (ground to pass U.S. 100 mesh sieve);
 4. Magcobar VG69 (organo-modified montmorillonite clay).

Based on the complete mixed composition, the mineral oil comprises from about 20 to about 90 weight percent, the smectite from about 10 to about 30 weight percent, and the filler from 0 to about 60 weight percent.

Figure 1:
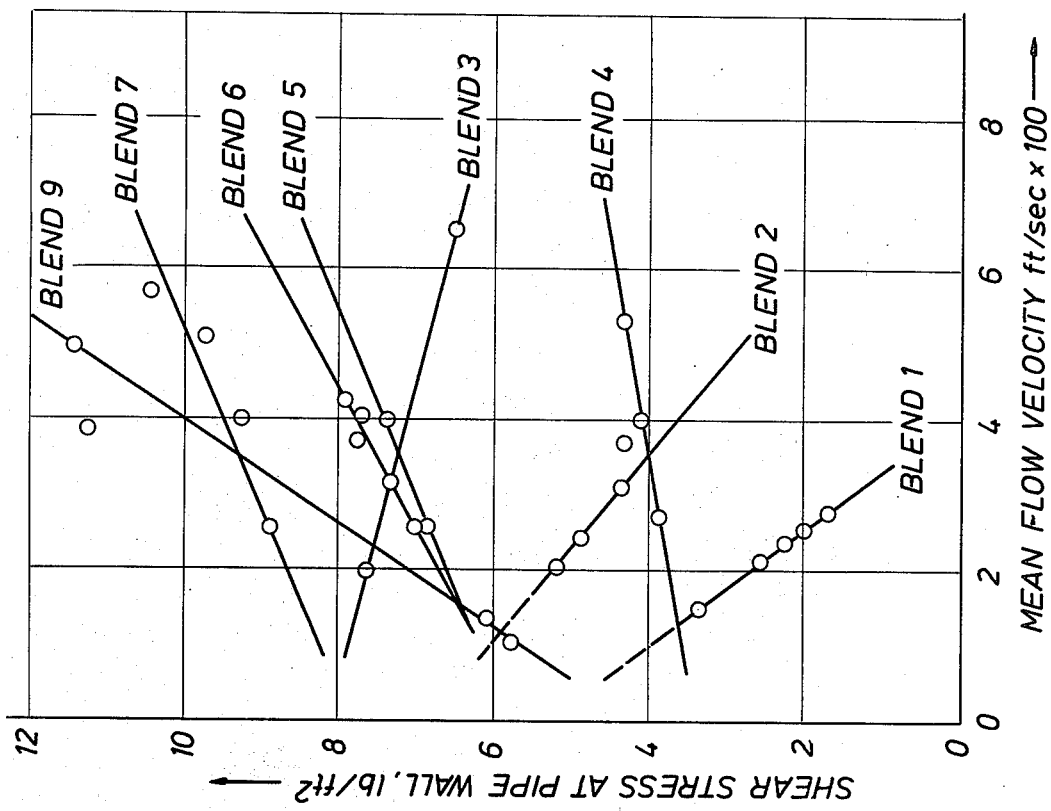
FIG. 1 shows the flow characteristics of movable gel plug blends of various compositions —2.05 inch diameter pipe tests.
Figure 2:
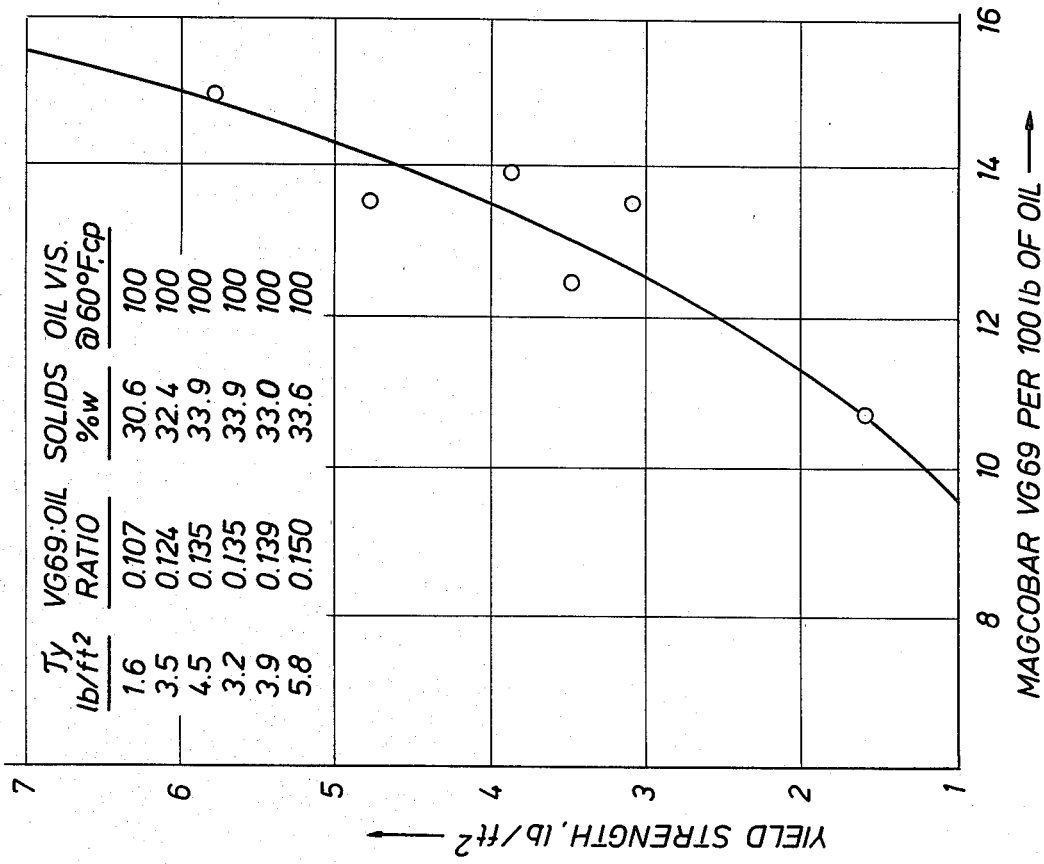
FIG. 2 shows the yield strength of gel plugs vs. Magcobar VC 69 content.

The variation in rheological properties obtainable by varying the above component quantities in gel plug formulations are shown in FIG. 1, Flow Characteristics of Movable Gel Plug Blends of Various Compositions 2.05 Inch Diameter Pipe Tests, and FIG. 2, Yield Strength of Gel Plugs vs. Magcobar VG69 Content. Test data are tabulated in Table III and FIG. 2.

EXAMPLES

Eight movable gel plug formulations were made in 4 to 5 barrel quantities in the field and tested in a cross-country pipeline. The compositions of these movable gel plug blends are shown in Table 4.

Figure 3:
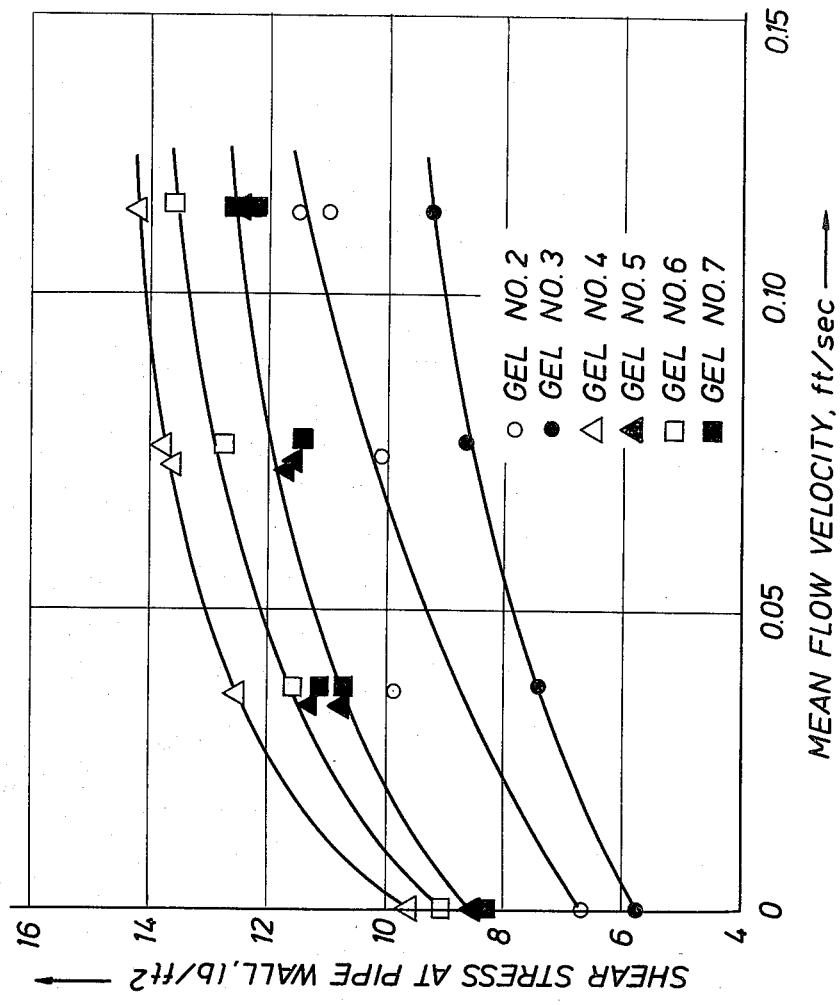
FIG. 3 shows shear stress vs. flow rate for gel plugs in a 2.05 inch diameter pipeline.
Figure 4:
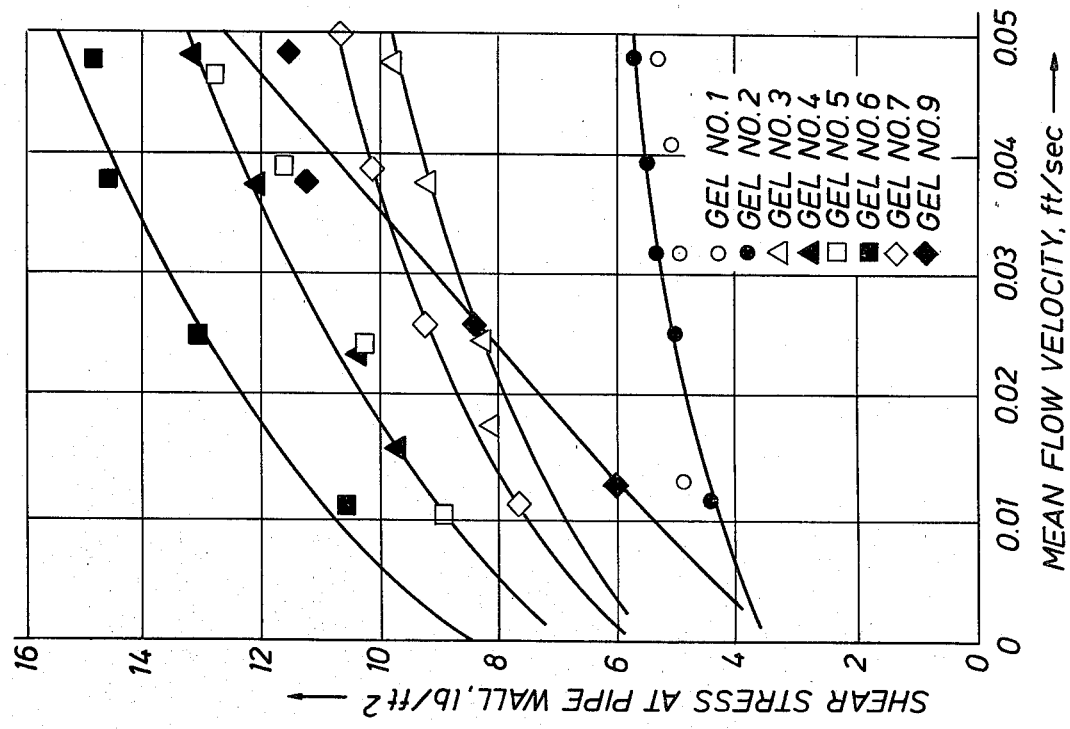
FIG. 4 shows shear stress at pipe wall vs. flow velocity in 6 inch pipeline for various movable gel plugs.

Pertinent data for gel plug Blend 1 through Blend 9 are summarized in Tables 4 and 5, and FIG. 3, Shear Stress vs. Flow Rate for Gel Plugs Flowing in a 2.05 Inch Diameter Pipeline, and FIG. 4, Shear Stress at Pipe Wall vs. Flow Velocity in 6 Inch Pipeline for Various Movable Gel Plugs. These data show the gel plugs tested were shear-thinning Bingham plastics. These plugs have finite yield strength values and will maintain a non-creep positive seal between pressured water and ambient air for long time periods. These gel plugs do not develop strong gel structures upon standing stagnant for long time periods.

Gel plug No. 9 is different from other gel plugs tested in that it contains no solid other than the Magcobar VG69. The viscosity of the plug is controlled by controlling the oil viscosity and the yield strength is controlled by controlling the quantity of gelling organo-modified clay.

Figure 5:
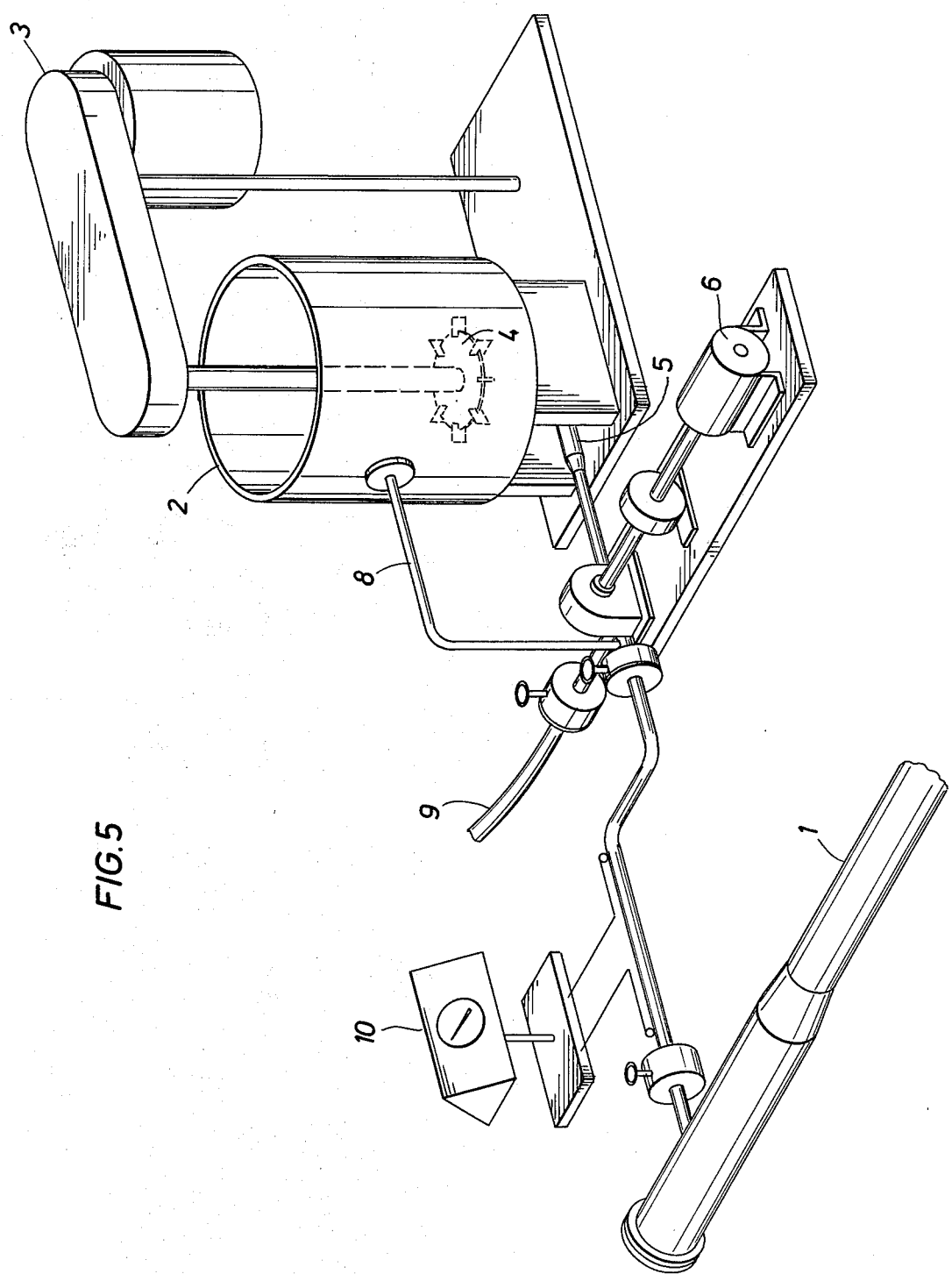
FIG. 5 shows mixing apparatus useful in making the compositions herein.

Mixing of these ingredients preferably takes place according to the following procedure: The proper ratio of the two oils to obtain a desired viscosity of the resulting blend is added to a mixing vessel similar to the one shown schematically in FIG. 5 and mixed. Smectite and filler, if desired, are added simultaneously while mixing, according to a time, weight-added program, and in the proper ratio, to provide the desired properties of the final composition which is admitted to the pipeline 1. Mixing occurs in a vessel 2 having a motor 3 (about 10 HP-variable rpm), which drives a variable height impeller 4 at 300–800 rpm; suction is drawn at line 5 by a variable, reversible pump assembly 6. Line 8 provides means for bypassing pump 6. Suction hose 9 is provided for loading vessel 2. A differential meter 10 monitors injection of the gel material into line 1.

TABLE 1

| Typical Properties of Materials Blended to Make Oils for Movable Gel Plugs | | |
|---|---|---|
|  | Dubbs No. 9 Flashed Residue | OP-2 Light Gas Oil (APO-100) |
| Gravity, °API @ 60 | 9–10 | 12.2–17.3 |
| Viscosity, SSU @ °F. |  |  |
| 100 | — | 34–37 |
| 210 | 500 | — |
| Flash PMCC, °F. | — | 200 min. |
| Pour Point, °F. | +60 | −25 |
| Aromatics, % w | 75 | 93–98 |
| Water, % w | — | 1 |
| Distillation, °F. |  |  |
| IBP |  | 425–450 |
| 10 |  | 465 |
| 50 |  | 495 |
| 90 |  | 570 |
| EP |  | 600–660 |

TABLE 2

| Typical Properties of Solids Used to Make Movable Gel Plugs | |
|---|---|
|  | % w |
| Coal |  |
| Sulphur | <1 |
| Moisture | 1–2 |
| Sieve Analysis |  |
| +100 US Mesh | 0 |

TABLE 2-continued
Typical Properties of Solids Used to Make Movable Gel Plugs

|  | % w |
|---|---|
| +200 US Mesh | 8-9 |
| +325 US Mesh | 33-38 |
| −325 US Mesh | 55-59 |
| Magcobar VG69 | |
| Moisture | 3-4 |
| Organic[1] | 42 |

[1]VG69 (trademark of Magobar Oil Field Product Division of Dresser Industries) is a quaternary exchanged bentonite containing 42% w organic. The quaternary alkyl groups contain 15-16 carbon atoms.

TABLE 3
Movable Gel Plug Blends - Laboratory Data Obtained Prior to Field Tests with Some Components

| Component | Blend 1 | Blend 2 | Blend 3 | Blend 4 | Blend 5 | Blend 6 | Blend 7 | Blend 9 |
|---|---|---|---|---|---|---|---|---|
|  | Grams Per 100 Grams of Blend | | | | | | | |
| Dubbs No. 9 Residue[1] | 19.58 | 19.35 | 18.12 | 30.85 | 29.87 | 29.52 | 29.45 | 54.3 |
| O.P. 2 Light Gas Oil[1] | 42.95 | 42.45 | 39.75 | 30.85 | 29.87 | 29.52 | 29.45 | 27.2 |
| −100 Mesh Alabama Coal[2] | 30.75 | 30.39 | 34.82 | 31.67 | 32.84 | 32.99 | 32.89 | 0.0 |
| Magcobar VG69[2] | 6.72 | 7.80 | 7.30 | 6.63 | 7.41 | 7.97 | 8.23 | 18.5 |
|  | Shear Stress in lbs/ft² at Flow Velocity in ft/sec × 100 | | | | | | | |
|  | 3.2/1.6 | 5.1/2.1 | 7.6/2.1 | 3.8/2.7 | 6.8/2.6 | 6.9/2.7 | 8.8/2.6 | 6.0/1.4 |
|  | 2.5/2.2 | 4.9/2.5 | 7.3/3.2 | 4.0/4.0 | 7.3/4.0 | 7.7/4.1 | 9.2/4.0 | 8.7/2.5 |
|  | 2.0/2.6 |  | 6.4/6.5 | 4.3/5.3 | 7.8/5.2 | 7.9/5.3 | 9.6/5. | 11.3/3.8 |
|  | 1.7/2.9 |  |  |  |  | 7.7/3.8 | 10.4/5.7 | 11.5/4.9 |
|  |  | 4.3/3.8 |  |  |  | 8.2/5.1 |  |  |
|  |  | 4.3/3.8 |  |  |  |  |  |  |

[1]See Table 1
[2]See Table 2

TABLE 4
Gel Plug Blend Compositions
Pounds in Blend

| | Blend 1 | Blend 2 | Blend 3 | Blend 4 | Blend 5 | Blend 6 | Blend 7 | Blend 8 | Blend 9 |
|---|---|---|---|---|---|---|---|---|---|
| OIL | 873 | 912 | 903 | 905 | 906 | 905 | 905 | 905 | 1,251 |
| COAL | 495 | 509 | 512 | 540 | 542 | 546 | 535 | 535 | 0 |
| VG69 | 129 | 130 | 136 | 145 | 145 | 144 | 140 | 140 | 231 |
| Component[1] Properties | | | | | | | | | |
| Oil °API @ 60° F. | 10.9 | 11.1 | 11.3 | 10.6 | 10.6 | 10.5 | 10.5 | 10.5 | 10.0 |
| Vis, cp @ | | | | | | | | | |
| 50° F. | 140 | 230 | 150 | 237 | 237 | 190 | 190 | 190 | 2,000 |
| 80° F. | 50 | 75 | 55 | 80 | 80 | 65 | 65 | 65 | 440 |
| 100° F. | 31 | 43 | 32 | 47 | 47 | 38 | 38 | 38 | 200 |

[1]See Table 2 for Properties of Coal and VG69

TABLE 5
Viscosity of Gel Plugs at 0.1 ft/sec Flow Velocity in 6.065 Inch Pipeline

| Gel No. | Pipe Temp., °F. | Plastic[1] Vis., P | Yield[2], lbs/ft² |
|---|---|---|---|
| 2 | 56 | 543 | 7.0 |
| 3 | 62 | 569 | 5.8 |
| 4 | 65 | 630 | 9.6 |
| 5 | 63 | 543 | 8.3 |
| 6 | 64 | 579 | 9.1 |
| 7 | 65 | 538 | 8.4 |

[1]Slope viscosity - Buckingham Equation
[2]Pipeline yield strength valves

TABLE 6
Restart of Stagnant Gel Plugs Using A P.D. Pump with No Bypass

| Gel No. | Location from Pump, ft | Down Time, hrs | Line Temp., °F. | Recorded Pressure, PSIG Minimum | Recorded Pressure, PSIG Maximum | Average Flowing | Max. Flowing Ratio |
|---|---|---|---|---|---|---|---|
| 1 | +900 | 2.0 | 36 | 35 | 82 | 56 | 1.5 |
| 1 | +1,000 | 0.12 | 56 | 35 | 70 | 56 | 1.3 |
| 1 | +1,600 | 10.0 | 56 | 38 | 94 | 59 | 1.6 |
| 2 | +4,500 | 0.5 | 57 | 40 | 90 | 62 | 1.5 |
| 2 | +5,000 | 1.1 | 57 | 48 | 96 | 70 | 1.4 |
| 2 | +13,000 | 0.25 | 57 | 48 | 80 | 70 | 1.1 |
| 4 | +3,500 | 0.25 | 63 | 65 | 103 | 83 | 1.2 |
| 4 | +4,000 | 1.25 | 63 | 65 | 115 | 95 | 1.2 |
| 4 | +4,500 | 8.0 | 63 | 45 | 132 | 91 | 1.5 |
| 5 | +3,500 | 0.25 | 63 | 53 | 104 | 77 | 1.4 |
| 5 | +4,500 | 0.5 | 63 | 53 | 104 | 77 | 1.4 |
| 5 | +4,800 | 0.25 | 63 | 53 | 98 | 77 | 1.3 |
| 5 | 13,000 | 4.0 | 63 | 52 | 101 | 77 | 1.3 |
| 6 | +3,400 | 0.25 | 64 | 60 | 80 | 75 | 1.1 |
| 6 | +6,000 | 0.1 | 64 | 60 | 90 | 75 | 1.2 |
| 6 | +6,500 | 0.5 | 64 | 58 | 90 | 81 | 1.1 |
| 6 | +12,500 | 3.0 | 64 | 58 | 120 | 84 | 1.4 |
| 7 | +3,500 | 0.15 | 64 | 58 | 96 | 74 | 1.3 |
| 7 | +4,000 | 0.15 | 64 | 58 | 108 | 80 | 1.4 |
| 7 | +6,000 | 2.0 | 64 | 58 | 104 | 74 | 1.4 |
| 7 | +12,500 | 3.5 | 64 | 64 | 119 | 85 | 1.4 |

What is claimed is:

1. A non-thixotropic Bingham plastic composition for a gel plug movable at a predetermined pressure in a pipeline and capable of withstanding hydrostatic forces below said predetermined pressure, comprising about 20–90%w of a vacuum-flashed residue from thermally cracked oils containing aromatics and asphaltenes, about 10–30%w of a tetraalkyl ammonium smectite, and about 0–60%w of a particulate filler.

2. A non-thixotropic Bingham plastic composition for a gel plug movable at a predetermined pressure in a pipeline and capable of withstanding hydrostatic forces below said predetermined pressure, comprising about 20–90%w of a residual light gas oil containing aromatics, at about 10–30%w of a tetraalkyl ammonium smectite, and about 0–60%w of a particulate filler.

* * * * *